(12) United States Patent
Meislahn

(10) Patent No.: US 8,002,232 B2
(45) Date of Patent: Aug. 23, 2011

(54) SYSTEM AND METHOD OF CATALYTIC CONVERTER THEFT DETERRENCE

(75) Inventor: Steven Meislahn, Dubuque, IA (US)

(73) Assignee: Monat Technologies, Phoenix, AZ (US)

( * ) Notice: Subject to any disclaimer, the term of this patent is extended or adjusted under 35 U.S.C. 154(b) by 40 days.

(21) Appl. No.: 12/649,056

(22) Filed: Dec. 29, 2009

(65) Prior Publication Data

US 2010/0258703 A1    Oct. 14, 2010

Related U.S. Application Data

(60) Provisional application No. 61/167,530, filed on Apr. 8, 2009.

(51) Int. Cl.
*F16M 13/00* (2006.01)

(52) U.S. Cl. .............. 248/551; 70/14; 70/18; 70/58; 248/58; 248/317

(58) Field of Classification Search .......... 248/551, 248/552, 553, 58, 62, 317; 70/14, 18, 58, 70/178; 180/287
See application file for complete search history.

(56) References Cited

U.S. PATENT DOCUMENTS

| | | | |
|---|---|---|---|
| 3,410,122 A | 11/1968 | Moses | |
| 4,028,913 A | 6/1977 | Falk | |
| 4,191,034 A | 3/1980 | Froess et al. | |
| 4,495,787 A | 1/1985 | Comstock | |
| 4,592,317 A | 6/1986 | Wrobel | |
| 5,291,762 A | 3/1994 | Fornaro et al. | |
| 5,612,878 A | 3/1997 | Joao et al. | |
| 5,839,081 A | 11/1998 | Joao et al. | |
| 2009/0107752 A1 * | 4/2009 | Dusa, II | 180/287 |
| 2010/0140420 A1 * | 6/2010 | Deichman | 248/58 |

OTHER PUBLICATIONS

The CatClamp internet website http://www.catclamp.com.
The CatCuff internet website http://www.theclub.com/default.aspx?act=catalog.aspx&catalogid=1346&spxAutoDetectCookieSupport=1.
The Cat-Con internet website http://catconprotector.com/.

* cited by examiner

Primary Examiner — Ramon O Ramirez

(57) ABSTRACT

A device used to secure an automobile catalytic converter. The invention deters a person from tampering with or stealing a catalytic converter. The device consists of at least four overlapping, and adjustable plates comprising an adjustable frame structure that clamp around the catalytic converter. Tightening of fasteners keeps the frame structure securely in position around the catalytic converter, preventing easy access to the catalytic converter. The frame structure is then secured to the automobile itself with a looped cable, which prevents easy removal of the catalytic converter.

20 Claims, 3 Drawing Sheets

SYSTEM AND METHOD OF CATALYTIC CONVERTER THEFT DETERRENCE

CROSS REFERENCE TO RELATED APPLICATION

This application claims priority to U.S. Provisional Application No. 61/167,530 to Steven Meislahn entitled Catalytic Converter Theft Deterrent Device filed on Apr. 8, 2009.

BACKGROUND OF THE INVENTION

1. Field of the Invention

This invention relates to the catalytic converter found on domestic and imported automobiles, and is specifically in regard to the deterrent of theft of these catalytic converters. The catalytic converter is part of an automobile's exhaust system and its role is to reduce harmful emissions through filtering the harmful gaseous output from an automobile's engine by putting the harmful gaseous output in contact with precious metals that filter out the harmful qualities of the emissions, leaving the remaining emissions that exit the exhaust system less harmful and less polluting. A rise in the global price of precious metals contained inside catalytic converters incentivizes thieves to remove catalytic converters from automobiles using common tools and to sell them for profit to metal recyclers. The opportunity to market a low-cost, effective and easy-to-use device to deter thieves from removing an automobile's catalytic converter is the intention behind the creation of this invention.

2. Description of Related Art

Various locking apparatus are well known in the art of anti-theft mechanical devices. Employing mechanical and electro-mechanical devices for automotive anti-theft purposes is also well known. However, in the art of automobile anti-theft devices, the most valuable vehicle components are secured within the locked interior of the vehicle, or under a locked hood. Other components are accessible from the undercarriage of the vehicle, but are difficult to access, and traditionally have not been the subject of extensive anti-theft protection.

A number of patents focus on means for locking or securing a car battery from being stolen. One example is U.S. Pat. No. 4,495,787, "Locking means for battery, etc." In this invention two "L" shaped brackets are securely mounted on the battery tray. These brackets then receive a top steel cover that clamps down on the two brackets that houses and is locked in place with a double ended sliding double bolt operated by means of a key cylinder lock. The key cylinder is embedded in a steel cover with a shear pin which will break and fix the steel plate in place if a thief tries and drill out the lock. While the locking means is designed to be employed for securing car batteries or "other automatic accessor[ies]" from being stolen, the brackets and top steel cover do not adjust to accommodate accessories of different sizes and would not readily accommodate a catalytic converter.

Another patent disclosing an apparatus for securing a car battery, U.S. Pat. No. 4,191,034 "Battery Lock," similarly discloses a system of vertical and horizontal bars that can be secured to the battery tray and locked to each other with a traditional lock/padlock to deter theft. This invention however is specifically tailored to car batteries, does not accommodate objects of varying size or a catalytic converter.

U.S. Pat. No. 4,028,913, "Citizen band radio locking device," discloses a fixed metal frame comprising a rectangular bar and a C-shaped bar transversely attached to a frame structure that can be secured to a stationary structure. The C-shaped bar carries a key actuated lock and spindle which bridges the opening between the ends of the C-shaped bar to confine and secure a CB radio within the frame structure. The device can accommodate slight size differences among radio dimensions by adjusting a number of thumb screws that extend into the space within the frame holding the radio firmly in place. This apparatus however does not have an adjustable frame, relies on a traditional lock for securing the apparatus, and could not be readily used to secure a catalytic converter.

U.S. Pat. No. 3,410,122 "Anti-theft lock for vehicular radios and tape players," discloses a pair of lock elements which may be attached to the mounting bracket of a vehicular radio or tape player and locked thereon to prevent theft. While the lock elements that attach to the mounting brackets allow for some adjustment to frame size, thereby accommodating variation in the size of the radios that can be housed, this device could not readily be employed to protect a catalytic converter and relies on a traditional key and lock assembly for securing the frame around the radio.

There are three different catalytic converter protection devices on the market today: (1) the CatClamp (http://www.atclamp.com), (2) The CatCuff (http://www.theclub.com/%8X%281%29S%28zphkza3tflhen 55g51p2ujv%29%9/default.aspx?act=catalog.aspx&catalogid= 346&Aspx uto etectCookieSupport=1), and (3) The Cat-Con Protector (http://catconprotector.com/). The CatClamp creates a cable net that encircles the catalytic converter and then wraps around the vehicles frame to secure the catalytic converter. It does not employ an adjustable frame structure that clamps onto the catalytic converter. The CatCuff also uses cables to secure a catalytic converter from theft. It does not employ an adjustable frame structure for clamping around or protecting the catalytic converter. Finally, The Cat-Con Protector, focuses on protecting the exhaust line up to the catalytic converter by a series of cables, and does not employ a frame structure that clamps to the catalytic converter itself. Additionally, installation of the Cat-Con requires welding components, and a lift or hoist for elevating the vehicle during installation.

So as to reduce the complexity and length of the Detailed Specification, and to fully establish the state of the art in certain areas of technology, Applicant herein expressly incorporate(s) by reference all of the following materials identified in each numbered paragraph below.

U.S. Pat. No. 5,612,878 Apparatus and method for motor vehicle anti-theft and/or theft deterrent.

U.S. Pat. No. 5,839,081 Apparatus and method for vehicle anti-theft.

U.S. Pat. No. 4,592,317 Motor vehicle theft deterrent device.

U.S. Pat. No. 5,291,762 Armored collar.

U.S. Pat. No. 4,495,787, Locking means for battery, etc.

U.S. Pat. No. 4,191,034, Battery lock.

U.S. Pat. No. 4,028,913, Citizen band radio locking device.

U.S. Pat. No. 3,410,122 Anti-theft lock for vehicular radios and tape players.

CatClamp disclosed at http://www.catclamp.com

CatCuff disclosed at http://www.theclub.com%28X%281%29S%28zphkza3tflhen 55 g51p2ujv%29%29/default.aspx?act=catalog.aspx&catalogid=1346& spxAuto DetectCookie Support=1)

Cat-Con Protector disclosed at http://catconprotector.com/

Applicant(s) believe(s) that the material incorporated above is "non-essential" in accordance with 37 CFR 1.57, because it is referred to for purposes of indicating the background of the invention or illustrating the state of the art.

However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

BRIEF SUMMARY OF THE INVENTION

The present invention is directed toward a catalytic converter theft deterrent device that deters the removal of a catalytic converter from the exhaust pipe of automobile vehicle. The catalytic converter theft deterrent device also referred to as a catalytic converter anti-theft device is an assembly that utilizes a fully adjustable plate design to surround the catalytic converter and uses one or more cables to affix the catalytic converter anti-theft device to the vehicle. The catalytic converter anti-theft device's unique assembly design simultaneously allows for modularity, ease of installation and economies of scale of production, the cost savings of which can be passed on to create value to the end consumer.

The primary goal of the invention is to provide a system and method for preventing a catalytic converter's theft from its vehicle location. The deterrence of theft is provided by steel plates and hardware which clamp around the catalytic converter and are then attached to the vehicle frame with one or more high quality steel cables.

It is an object of the invention to provide a system and method of theft deterrence that is simple in construction, inexpensive to manufacture and highly efficient to use.

Another object of the invention is to provide ease of access to the catalytic converter when replacement or repair of the catalytic converter is desired.

Other objects and advantages of the invention will become readily apparent from the following description taken in conjunction with the accompanying drawings.

The above and other objects may be achieved using devices involving an adjustable frame structure comprising at least four plates forming a top and bottom set of plates. Each set of plates overlap and can be adjusted to align at least two of the many holes provided for width adjustment so that the top and bottom sets of plates accommodate the width of various catalytic converters. The top and bottom sets of plates receive at least one vertical fastener that passes through the holes in the fastening flange and attaches the top and bottom plate sets, thereby clamping onto the catalytic converter. A cable attaches to the adjustable frame structure and wraps around or through the undercarriage of the vehicle securing the frame and the catalytic converter.

The above and other objects may be achieved using a method of clamping an adjustable frame structure around the catalytic converter. The adjustable frame structure comprises a top and bottom set of plates, each set comprises at least two overlapping plates. The overlapping plates are adjusted for catalytic converter width, by fastening the plates together using the multiple width adjustment holes. The top and bottom overlapping plate sets fastened together by passing at least one vertical fastener through holes in both sets, such that the top and bottom sets clamp around the catalytic converter. The cable attaches to the adjustable frame structure and to the undercarriage of a vehicle by wrapping the cable around or through one or more elements of both the undercarriage of the vehicle and the adjustable frame structure. The above and other objects may be achieved using devices involving an adjustable frame structure comprising at least four plates forming a top and bottom set of plates. Each set of plates overlap and can be adjusted to align at least two of the many holes provided from width adjustment so that the top and bottom sets of plates accommodate the width of various catalytic converters. The top and bottom sets of plates receive at least one vertical fastener passing through the holes in the fastening flange to attach the top and bottom plate sets, thereby clamping onto the catalytic converter. At least two of the plates have fastening flanges being bent beyond the fastening flange to extend along and shield the vertical fastener, being substantially parallel to it. A cable attaches to the adjustable frame structure and wraps around or through the undercarriage of the vehicle securing the frame and the catalytic converter.

The above and other objects may be achieved by using (or employing a method to use) plates comprised of steel, steel plates with a powder coated finish, a cable of aircraft grade steel, and by attaching the cable to the frame through at least one eye bolt. The cable may also be attached to the plates by passing it through a hole in at least one of the plates intended for the cable or for heat dispersion.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. §112, ¶ 6. Thus, the use of the words "function," "means" or "step" in the Detailed Description or Description of the Drawings or claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the inventions, the claims will specifically and expressly state the exact phrases "means for" or "step for, and will also recite the word "function" (i.e., will state "means for performing the function of . . . " [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. §112, ¶ 6. Moreover, even if the provisions of 35 U.S.C. §112, ¶ 6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention. It should be noted that there are many different and alternative configurations, devices and technologies to which the disclosed inventions may be applied. The full scope of the inventions is not limited to the examples that are described below.

Figure 1:
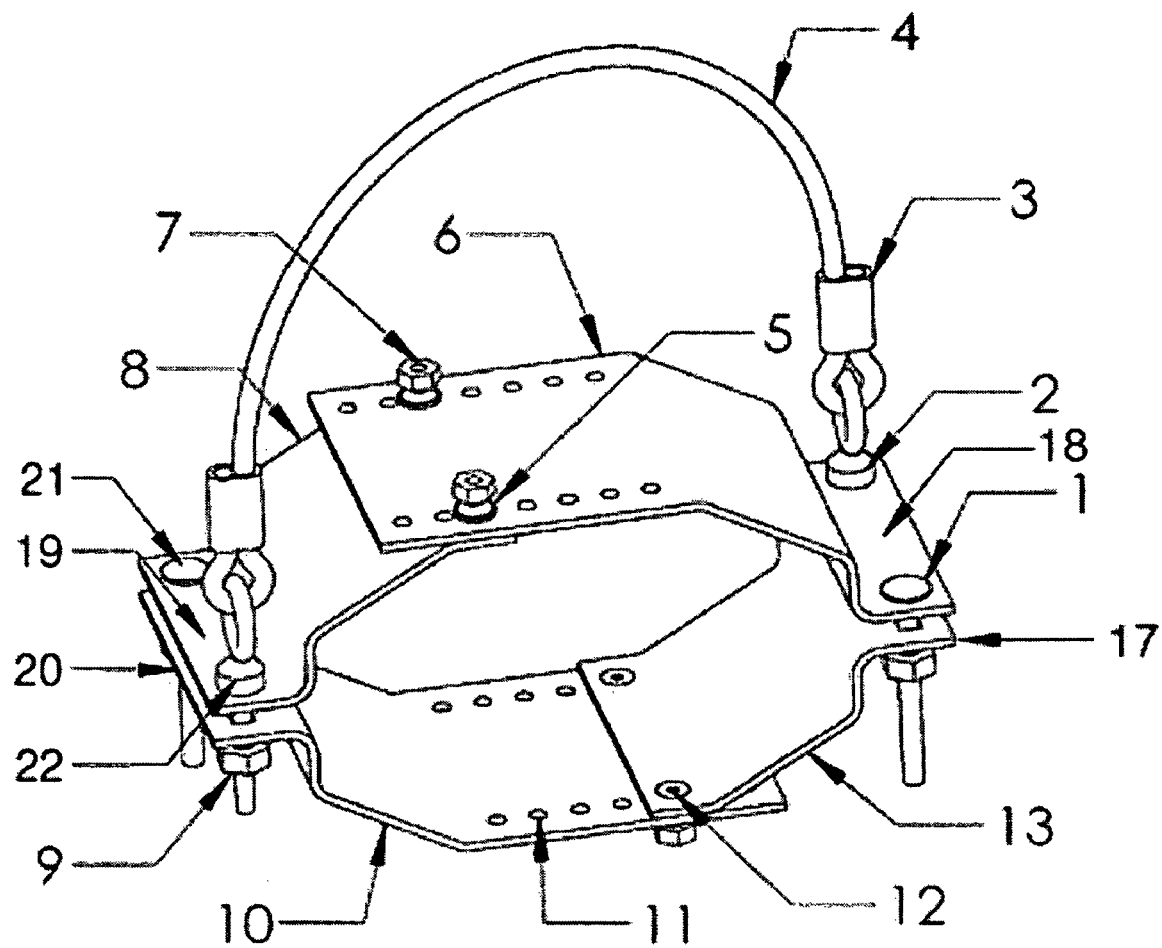
FIG. 1 depicts an isometric view of an uninstalled, catalytic converter theft deterrent device.
Figure 2:
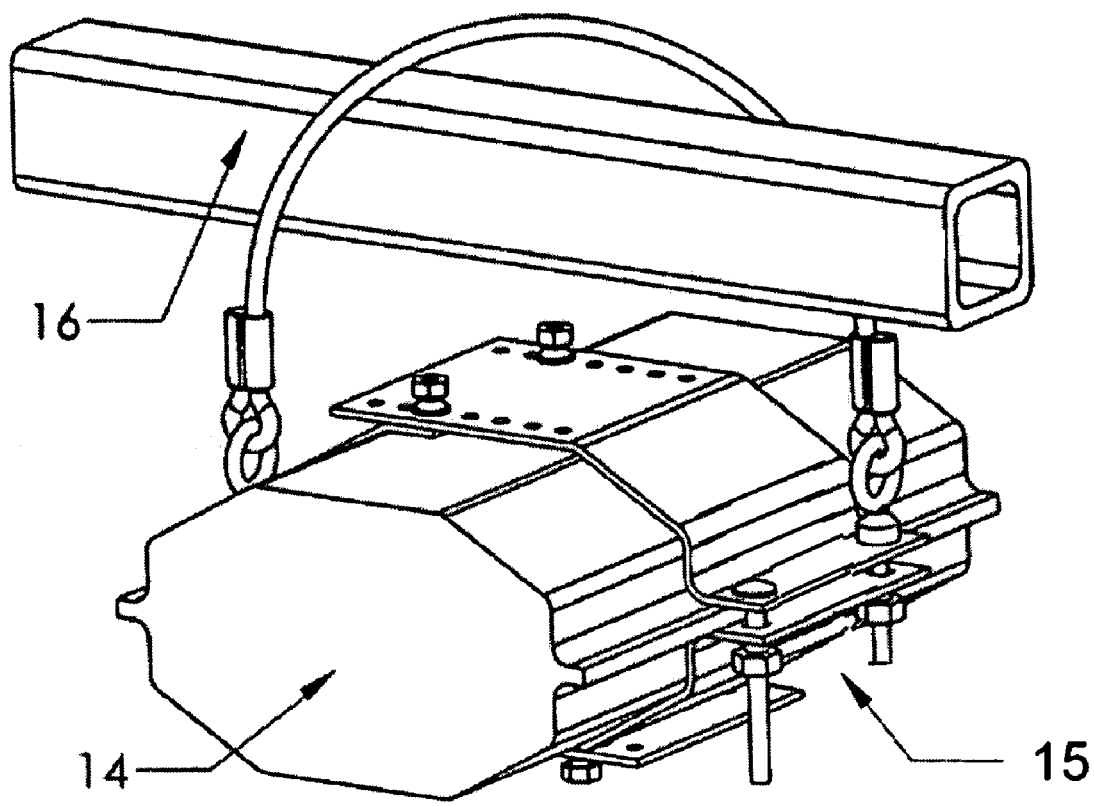
FIG. 2 depicts an isometric view of an installed catalytic converter theft deterrent device.

In one application of the invention, as shown in FIG. 1, the catalytic converter anti-theft device 15, fits around an automobile's catalytic converter 14, and the cable 4 is threaded, wound or weaved around the automobile undercarriage part 16, as shown as installed in FIG. 2. The catalytic converter anti theft device 15 is made up of four plates, referred to as plates with a fastening flange and a distal end with holes for width adjustment 6, 10, and plates with a fastening flange and a distal end 8, 13 as shown in FIG. 1. In another embodiment the plates with a fastening flange and a distal end with holes for width adjustment 6, 10 could be replaced with plates similar to plates with a fastening flange and a distal end 8, 13 and a third plate with multiple holes for horizontal alignment. The third plate may have multiple holes for horizontal adjustment and may be attached to the plates with a fastening flange and distal end. Thus, in other embodiments the clamping frame may be comprised of more than four plates, such as the six plate configuration just described. The plates with a fastening flange and a distal end with holes for width adjustment 6, 10 are identical and the plates with a fastening flange and a distal end 8, 13 are identical to each other, but do not have to be. The plates with a fastening flange and a distal end with holes for width adjustment 6, 10, and plates with a fastening flange and a distal end 8, 13 are held together with at least one fastener 12, that may, but need not be used with a washer 5, and a regular, permanent, or self-locking nut 7. The plates with a fastening flange and a distal end with holes for width adjustment 6, 10, and plates with a fastening flange and a distal end 8, 13 may be attached with more or fewer fasteners than those shown in the drawing of the preferred embodiment. The regular, permanent, or self-locking nuts 7 can also be nuts of any type configured to be tamper resistant. A permanent adhesive may be applied to the regular, permanent, or self-locking nuts 7 to minimize disassembly. The catalytic converter anti-theft device 15 is held securely to the catalytic converter 14 by installing at least one bolt or other fastener including an eyebolt 1, 2, 21, 22 through fastening flanges 17, 18, 19, 20. When tightened, the catalytic converter anti-theft device 15 is secured to the catalytic converter 14. Each side of the catalytic converter anti-theft device 15 may include more or fewer bolts or fasteners 1, 21 including bolts or fasteners including an eyebolt 2, 22 than what is shown in the preferred embodiment of the catalytic converter anti-theft device 15. In the preferred embodiment the bolts or fasteners 1, 21 including eyebolts 2, 22 are composed of Grade 8 steel, or any other type of readily commercially available steel or other metal. In the preferred embodiment the bolt or other fastener 2, 22 are grade 8 bolts. The regular, permanent, or self-locking nut 9 and the regular, permanent, or self-locking nut 7, which may be similar or different, are affixed to bolts or fasteners 1, 21, including bolts or fasteners including an eyebolt 2, 22 to permanently install the catalytic converter anti-theft device assembly 15 to the catalytic converter 14.

When the plates with fastening flanges 6, 8, 10, 13 comprising the top and bottom sets of plates do not touch when at least one bolt or other fastener 1, and 21, and at least one other bolt or fastener including an eyebolt 2, and 22, are tightened to clamp onto the catalytic converter 14, the exposed bolts or fasteners (including eyebolts) 1, 2, 21, and 22 may pass through shielding, such as tube cut to length or a number of stacked washers or bushings that would shield the bolts or fasteners (including eyebolts) 1, 2, 21, 22 from being cut by a thief. Additionally, plates longer than but similar to the plates with fastening flanges 6, 8, 10, 13 could contain an additional bend of approximately 90 degrees from the fastening flanges 17, 18, 19, 20 that would allow the additional length of the plates 6, 8, 10, 13 to extend substantially perpendicular to, and away from, the fastening flange 17, 18, 19, 20 such that the fasteners 1, 21 or bolts including eyebolts 2, 22 would not be exposed along the outside of the catalytic converter anti-theft device 15, thus further protecting the bolts or fasteners (including eyebolts) 1, 2, 21, 22 from being easily cut by a thief.

A cable 4, is secured to the catalytic converter anti-theft device assembly 15 and is wrapped threaded or weaved around an element of the automobile undercarriage 16. The cable 4 is not limited as such, but may alternatively comprise a chain, rope, linkage, bar or other securing device. The cable may be secured by a cable loop forming device 3 but is not limited as such and may be a cable sleeve, clamp, knot, welded device, or other securing mechanism.

The multiple holes for width adjustment 11 on the plates with fastening flanges and a distal end with holes for width adjustment 6, 10, or on a third or other plate with holes for width adjustment, allow for the width of the catalytic converter anti-theft device 15 to be adjustable to fit the width of a variety of catalytic converters 14. The multiple holes for width adjustment 11 can be but are not limited to holes that are substantially circular, and may also include slots, or other adjustment provisions. The length of bolts or fasteners 1, 21, including bolts or fasteners including an eyebolt 2, 22 are chosen such that they allow for the height of the catalytic converter anti-theft device 15 to be adjusted to clamp onto catalytic converters 14 of different sizes. Bolts or fasteners 1, 21, including bolts or fasteners including an eyebolt 2, 22 can also attach the plates with fastening flanges 6, 8, 10, 13 via holes, slots, or other adjustment provisions.

The cable 4 is used to wrap around an element of the automobile undercarriage 16 such that the catalytic converter anti-theft device 15 and the catalytic converter 14 are permanently attached to the vehicle.

The catalytic converter anti-theft device 15 may be welded, formed, bolted, drawn, machined or cast, and all parts are to be made of a metal or another strong or durable material. A finish may or may not be applied to the catalytic converter anti-theft device 15 to prevent corrosion, enhance aesthetics, increase friction, or create other desirable affects.

The catalytic converter anti-theft device 15 is attached to the catalytic converter 14 to prevent the catalytic converter 14 from being forcibly removed in at least the following ways. First, the catalytic converter anti-theft device 15 physically shields the catalytic converter 14 and prevents quick and easy removal of the catalytic converter 14 from the automobile's exhaust pipe, increasing the time and effort it takes to forcibly remove the catalytic converter 14 from an exhaust pipe. Second, the bolt or other fastener including an eyebolt 2, 22, the cable loop forming device 3, and the cable 4 affix the catalytic converter 14 to the automobile undercarriage 16 such that even if the catalytic converter 14 is removed from exhaust pipe, it will still be attached to the automobile undercarriage 16. Third, the catalytic converter anti-theft device 15 also serves as a visual theft deterrent, making the vehicle a less desirable target for crime.

The preferred embodiment of the invention has been described in a fixed position relative to the vehicle and its catalytic converter 14. However the catalytic converter anti-theft device 15 could also be rotated 90 degrees, or any other number of degrees, to accommodate an installer's preference or custom exhaust system. In those instances the relative descriptions, such as "top" and "bottom," should be translated relative to the movement of the installation.

Figure 3:
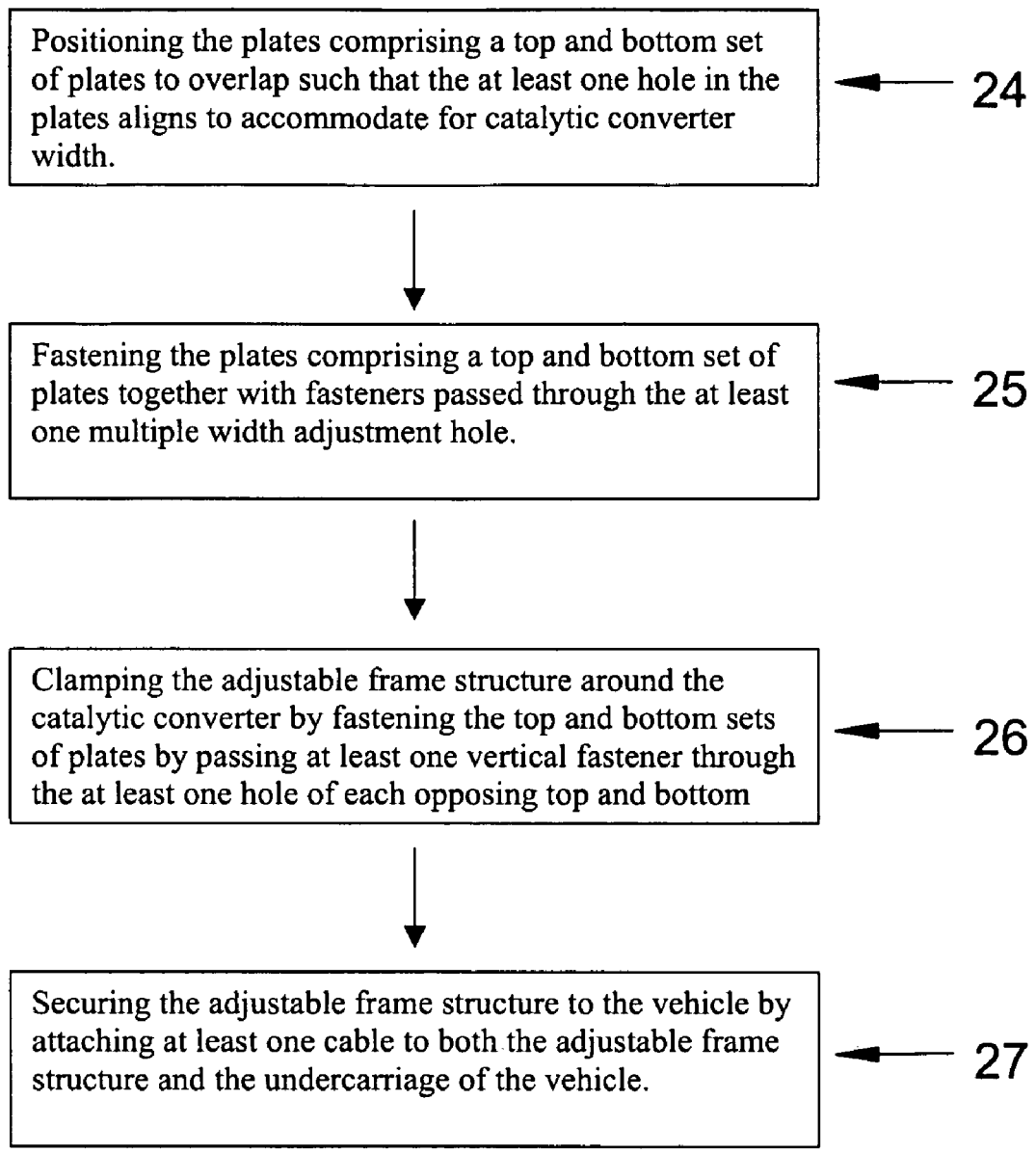
FIG. 3 is a block diagram of a method of deterring theft of a catalytic converter.

The method of catalytic converter theft deterrence is shown in FIG. 3. The method employs Positioning the plates comprising a top and bottom set of plates to overlap such that the at least one hole in the plates aligns to accommodate for catalytic converter width 24. Fastening the plates comprising a top and bottom set of plates together with fasteners passed through the at least one multiple width adjustment hole 25. Clamping the adjustable frame structure around the catalytic converter by fastening the top and bottom sets of plates by passing at least one vertical fastener through the at least one hole of each opposing top and bottom fastening flange 26. Securing the adjustable frame structure to the vehicle by attaching at least one cable to both the adjustable frame structure and the undercarriage of the vehicle 27.

I claim:

1. A catalytic converter theft deterrent device comprising:
    an adjustable frame structure having at least a top set and a bottom set of plates, each set comprising at least two plates having a fastening flange and a distal flange and at least two bends in the plate between the fastening flange and the distal flange such that a face of the fastening flange of the plate is parallel to a face of the distal flange of the plate, the fastening flange and distal flange each having at least one hole that receives a fastener;
    at least one vertical fastener passing through the at least one hole in the distal flange, the distal flange positioned to overlap a plate having multiple holes for width adjustment such that the at least one vertical fastener further passes through at least one of the multiple holes thereby fastening the overlapping distal flange to the plate having multiple holes;
    at least one vertical fastener passing through the at least one hole of each opposing top and bottom fastening flange connecting the top and bottom sets of plates such that the top and bottom sets of plates clamp around the catalytic converter; and
    at least one cable attached to the adjustable frame structure at two points, the at least one cable forming a loop that encircles at least a portion of at least one vehicle undercarriage element to secure the adjustable frame structure to a vehicle undercarriage.

2. The catalytic converter theft deterrent device of claim 1, wherein the plates are comprised of steel.

3. The catalytic converter theft deterrent device of claim 2, wherein the plates have a powder coated finish.

4. The catalytic converter theft deterrent device of claim 1, wherein the at least one cable is an aircraft grade steel cable.

5. The catalytic converter theft deterrent device of claim 1, wherein the at least one vertical fastener passing through the at least one hole of each opposing top and bottom fastening flange further passes through a protective housing extending between the top and bottom sets of plates such that the at least one fastener is not exposed between the top and bottom sets of plates when the fastener is tightened so that the adjustable frame structure clamps around the catalytic converter.

6. The catalytic converter theft deterrent device of claim 1, wherein the at least one cable is attached to the adjustable frame structure through at least one eyebolt fastened to the adjustable frame structure.

7. The catalytic converter theft deterrent device of claim 1, wherein there is at least one hole in a plate through which heat from the catalytic converter is dispersed.

8. A method of deterring the theft of a catalytic converter comprising the acts of:
    clamping an adjustable frame structure around the catalytic converter wherein the adjustable frame structure comprises at least a top set and a bottom set of plates, each set comprising at least two plates having a fastening flange and a distal flange and at least two bends in the plate between the fastening flange and the distal flange such that a face of the fastening flange of the plate is parallel to a face of the distal flange of the plate, the fastening flange and distal flange each having at least one hole that receives a fastener;
    positioning the distal flange to overlap a plate having multiple holes for width adjustment such that the at least one hole in the distal flange is aligned with at least one of the multiple holes;
    fastening the overlapping distal flange to the plate having multiple holes by passing at least one vertical fastener through the at least one hole in the distal flange and the at least one of the multiple holes in the plate with which the at least one hole in the distal flange is aligned;
    fastening the top and bottom sets of plates together by passing at least one vertical fastener through the at least one hole of each opposing top and bottom fastening flange such that the top and bottom sets of plates clamp around the catalytic converter; and
    securing the adjustable frame structure to a vehicle undercarriage by attaching at least one cable to the adjustable frame structure at two points such that the at least one cable forms a loop that encircles at least a portion of at least one vehicle undercarriage element.

9. The method of claim 8, wherein the plates of the adjustable frame structure are comprised of steel.

10. The method of claim 8, wherein the plates have a powder coated finish.

11. The method of claim 8, wherein the at least one cable is an aircraft grade steel cable.

12. The method of claim 8, wherein there is at least one hole in a plate through which heat from the catalytic converter is dispersed.

13. The method of claim 8, further comprising passing at least one vertical fastener attaching the top and bottom sets of plates through a protective housing extending between the top and bottom sets of plates such that the at least one fastener is not exposed between the top and bottom sets of plates when the fastener is tightened so that the adjustable frame structure clamps around the catalytic converter.

14. The method of claim 8, further comprising attaching the at least one cable to the adjustable frame structure using at least one eyebolt fastened to the adjustable frame structure.

15. The method of claim 8, further comprising the plates with fastening and distal flanges have at least one bend in the plate located beyond the fastening flange and at the opposing end of the distal flange, the bend causing the plate to be substantially parallel to the vertical fastener and shielding the vertical fastener that passes through the at least one hole of each opposing top and bottom fastening flange connecting the top and bottom sets of plates such that the top and bottom sets of plates clamp around the catalytic converter.

16. A catalytic converter theft deterrent device comprising:
an adjustable frame structure having at least a top set and a bottom set of plates; each set comprising at least two plates having a fastening flange and a distal flange and at least two bends in the plate between the fastening flange and the distal flange such that a face of the fastening flange of the plate is parallel to a face of the distal flange of the plate the fastening flange and distal flange each having at least one hole that receives a fastener;
wherein the plates with fastening and distal flanges have at least one bend in the plate located beyond the fastening flange and at the opposing end of the distal flange, the bend causing the plate to be substantially parallel to the vertical fastener and shielding at least one vertical fastener that passes through the at least one hole of each opposing top and bottom fastening flange connecting the top and bottom sets of plates such that the top and bottom sets of plates clamp around the catalytic converter;
at least one vertical fastener passing through the at least one hole in the distal flange, the distal flange positioned to overlap a plate having multiple holes for width adjustment such that the at least one vertical fastener further passes through at least one of the multiple holes thereby fastening the overlapping distal flange to the plate having multiple holes; and
at least one cable attached to the adjustable frame structure at two points, the at least one cable forming a loop that encircles at least a portion of at least one vehicle undercarriage element to secure the adjustable frame structure to a vehicle undercarriage.

17. The catalytic converter theft deterrent device of claim 16, wherein the plates are comprised of steel.

18. The catalytic converter theft deterrent device of claim 16, wherein the plates have a powder coated finish.

19. The catalytic converter theft deterrent device of claim 16, wherein the automobile linkage member is an aircraft grade steel cable.

20. The catalytic converter theft deterrent device of claim 16, further comprising attaching the at least one cable to the adjustable frame structure using at least one eyebolt fastened to the adjustable frame structure.

\* \* \* \* \*